United States Patent [19]

Wuhrmann et al.

[11] Patent Number: 4,655,960

[45] Date of Patent: Apr. 7, 1987

[54] FOAM INHIBITORS FOR AQUEOUS SYNTHETIC RESIN COMPOSITIONS

[75] Inventors: Juan C. Wuhrmann, Duesseldorf; Heinz Mueller, Wuppertal; Karl-Dieter Brands; Adolf Asbeck, both of Duesseldorf; Jochen Heidrich, Monheim, all of Fed. Rep. of Germany

[73] Assignee: Henkel Kommanditgesellschaft auf Aktien, Duesseldorf, Fed. Rep. of Germany

[21] Appl. No.: 688,225

[22] Filed: Jan. 2, 1985

[30] Foreign Application Priority Data

Jan. 2, 1984 [DE] Fed. Rep. of Germany ....... 3400014

[51] Int. Cl.$^4$ .................. B01D 17/00; B01D 19/04
[52] U.S. Cl. .................................. 252/321; 252/358; 524/268
[58] Field of Search ............... 252/321, 358; 524/268, 524/488

[56] References Cited

U.S. PATENT DOCUMENTS

| | | | |
|---|---|---|---|
| 2,085,709 | 6/1931 | Steibelt | 252/358 X |
| 3,207,698 | 9/1965 | Liebling | 252/321 |
| 3,329,625 | 7/1967 | Hoxie | 252/358 |
| 3,388,073 | 6/1968 | Domba | 252/321 |
| 3,705,860 | 12/1972 | Duvall | 252/358 |
| 3,784,479 | 1/1984 | Keil | 252/358 |
| 3,909,445 | 9/1975 | Ernst | 252/358 X |
| 3,923,683 | 12/1975 | Michalski et al. | 252/358 X |
| 4,056,481 | 11/1977 | Tate | 252/358 X |
| 4,071,468 | 1/1978 | Abel et al. | 252/358 X |
| 4,092,266 | 5/1978 | Abel et al. | 252/358 X |
| 4,132,535 | 1/1979 | Rivers, Jr. et al. | 55/23 |
| 4,132,694 | 1/1979 | Heyden | 260/29.6 R |
| 4,145,310 | 3/1979 | Satterwhite et al. | 252/358 |
| 4,341,656 | 7/1982 | Abel | 252/321 |
| 4,421,666 | 12/1983 | Hempel et al. | 252/140 |
| 4,451,390 | 5/1984 | Flannigan | 252/321 |
| 4,520,173 | 5/1985 | Fink et al. | 525/403 |
| 4,540,511 | 9/1985 | McCaffrey et al. | 252/358 X |
| 4,543,375 | 9/1985 | Doebler et al. | 523/348 |

FOREIGN PATENT DOCUMENTS

| | | |
|---|---|---|
| 0037542 | 3/1981 | European Pat. Off. . |
| 0063346 | 4/1982 | European Pat. Off. . |
| 1257111 | 3/1968 | Fed. Rep. of Germany . |
| 3745583 | 10/1977 | Fed. Rep. of Germany . |
| 2745583 | 4/1979 | Fed. Rep. of Germany . |
| 3001387 | 1/1980 | Fed. Rep. of Germany . |

OTHER PUBLICATIONS

European Search Report EP 84115267.

Primary Examiner—Richard D. Lovering
Assistant Examiner—Catherine S. Kilby
Attorney, Agent, or Firm—Ernest G. Szoke; Henry E. Millson, Jr.

[57] ABSTRACT

The formation of troublesome microfoams in aqueous lacquer and synthetic resin dispersions, particularly in gloss lacquers, is prevented by the addition of from about 0.01 to about 1.5% by weight of a silicone-free foam inhibitor mixture. This mixture consists of (a) from about 70 to about 98% by weight of a mineral oil liquid at room temperature or a mixture of such mineral oil with a $C_{16}$-$C_{30}$ branched alcohol of the following formula

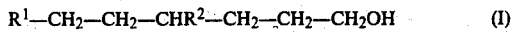

$$R^1-CH_2-CH_2-CHR^2-CH_2-CH_2-CH_2OH \qquad (I)$$

in which $R^1$ and $R^2$ are $C_4$-$C_{16}$ alkyl radicals, (b) from about 0.2 to about 5% by weight of a microcrystalline wax, (c) from about 0.5 to about 20% by weight of hard paraffin, (d) from 0.05 to 5% by weight of hydrophobized finely divided silica, and (e) from 0 to about 10% by weight of a soft paraffin (M.p. 32°-42° C.). Component (a) preferably consists of a mixture of mineral oil and branched alcohol (I) in a ratio of from 50:1 to 1:1.

15 Claims, No Drawings

FOAM INHIBITORS FOR AQUEOUS SYNTHETIC RESIN COMPOSITIONS

BACKGROUND OF THE INVENTION

1. Field of the Invention

This invention relates to foam inhibitor mixtures to inhibit the formation of microfoams in aqueous lacquer and synthetic resin dispersions.

2. Description of the Related Art

Aqueous synthetic resin solutions and dispersions of the type used, for example, as binders for printing inks, wood and metal lacquers, and as coatings for paper and plastics are mostly based on water-soluble alkyd resins, polyacrylates, or polyesters. The alkyd resins used are those with carboxyl functionality, such as oils modified with maleic acid, oil-modified alkyds and oil-free polyesters; in addition to the neutralization component, usually an amine, a co-solvent component is frequently present. Polyacrylate-based lacquers use copolymeric acrylic acid derivatives which may be combined both with melamine or urea resins and also with polyurethanes. Suitable polyesters are modified unsaturated compounds in emulsion form.

Due to the presence of emulsifiers and salt-forming carboxyl groups, the binder systems present foaming problems during production and application which generally cannot be solved with standard foam inhibitors. Thus, where conventional alkyl polysiloxanes are used in the form of emulsions or in the form of solutions in hydrocarbons, serious surface faults known among those skilled in the art as craters, fisheyes and orange-peel effects are obtained.

On the other hand, the organopolysiloxanes suitable and specifically developed for such applications are comparatively expensive. Accordingly, repeated attempts have been made to replace them completely or in part by inexpensive foam inhibitors.

However, where these inhibitors additionally contain other known defoaming agents, for example, those based on mineral oils or ester oils based on long-chain linear fatty acids, incompatibility with the binder system and exudation on the lacquer surface can occur despite the addition of emulsifiers. Foam inhibitors containing organic solvents, such as low molecular weight glycols, ketones or esters, are attended by the disadvantage that residual foams plainly visible after drying of the lacquers remain in the form of surface foam or microfoam. In addition, such solvents frequently have a low flash point and necessitate additional safety precautions for transport and for handling due to critical MWC (maximum workplace concentration) values and toxic loads. For the reasons explained above, defoaming mixtures such as these are unsuitable for the purposes of the present invention.

In addition, German Application No. 12 57 111 describes foam inhibitors consisting of esters of branched-chain fatty acids and branched-chain monoalcohols. These esters are suitable for use as defoaming agents in the textile, detergent and food industries and also in chemical reactions and in distillation. Their use in aqueous synthetic resin dispersions is not mentioned and it can be shown that, in the absence of other foam inhibitors, the effect of these esters is inadequate.

German Application No. 30 13 391 describes a silicone-free foam inhibitor which consists of a homogeneous mixture of branched-chain $C_{18}$–$C_{30}$ primary alcohols, particularly Guerbet alcohols, and silanized silica in a ratio of alcohol to silica of from 100:2 to 100:20. The substantially silicone-free foam inhibitor is primarily intended for incorporation in detergents and cleaners.

German Application No. 31 15 644 teaches that the effect of this foam inhibitor for the particular purpose of incorporation in detergents and cleaners may be enhanced by mixing with waxes, such as paraffin, montan wax or ester waxes, and also by application to a water-soluble salt-like carrier, such as sodium tripolyphosphate. The use of such foam-inhibiting granulates in aqueous synthetic resin dispersions is not mentioned. In fact, the foam inhibitors of the above Application No. 31 15 644 would be unsuitable for that purpose due to their high salt content.

In addition, German Application No. 27 45 583 describes foam inhibitors for aqueous polymer dispersions which consist of a mixture of from 10 to 95% of an organic carrier liquid, for example a paraffin oil, from 1 to 5% of a synthetic hard paraffin solidifying at 90° to 100° C., from 0.5 to 2% of the magnesium salt of a fatty acid, from 0.5 to 5% of a hydrophobized silica, and from 2 to 20% of a non-ionic emulsifier. The need to stabilize foam inhibitors such as these by additions of emulsifiers and thickeners (fatty acid magnesium soaps) is a disadvantage because these non-foam-inhibiting additives can lead to incompatibilities with the aqueous lacquer dispersions, particularly gloss lacquers. In the case of gloss lacquers, so-called microfoams can also lead to serious faults, such as pore and crater formation and loss of gloss. Such microfoams can form, for example, when the lacquer dispersion is applied to the surface to be coated. Unless their formation is suppressed or unless they are destroyed before the lacquer layer hardens, the pores and craters mentioned above are formed.

DESCRIPTION OF THE INVENTION

It has now been found that foam inhibiting mixtures having the following composition:
(a) from about 70 to about 98% by weight of an organic carrier material which is liquid at room temperature (21° C.), and which consists of a mineral oil or a mixture of a mineral oil with at least one alcohol having the formula:

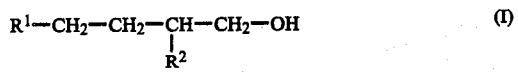

$$R^1-CH_2-CH_2-CH-CH_2-OH \quad\quad (I)$$
$$\phantom{R^1-CH_2-CH_2-}R^2$$

in which $R^1$ and $R^2$ can be the same or different and represent $C_4$–$C_{16}$ alkyl radicals, and wherein the total number of carbon atoms in the alcohol is between 16 and 30,
(b) from about 0.2 to about 5% by weight of at least one microcrystalline paraffin wax having a melting point of from about 60° to about 95° C.,
(c) from about 0.5 to about 20% by weight of at least one hard paraffin having a melting point of from about 40° to about 60° C.,
(d) from about 0.05 to about 5% by weight of hydrophobized finely divided silica, and
(e) from 0 to about 10% by weight of a soft paraffin having s melting point of from about 32° to about 42° C. are advantageously used as foam inhibitors in aqueous lacquer and synthetic resin dispersions.

Suitable mineral oils (component a) are aliphatic and alicyclic (naphthenic) paraffin oils having an average molecular weight of from about 140 to about 250, a pour point below about 10° C. and a boiling point above about 180° C. These mineral oils can be partly replaced by branched-chain, primary alcohols corresponding to formula I above. Alcohols which have proved to be particularly suitable are Guerbet alcohols which may be obtained in known manner from straightchain saturated alcohols or alcohol mixtures containing from 6 to 16 C-atoms, for example by heating those alcohols in the presence of strong alkalis. It has been found that foam inhibitors in which component (a) consists of a mixture of mineral oil and alcohols corresponding to formula I can have a greater effect than the use of mineral oil alone. Mixtures characterized by a ratio by weight of mineral oil to alcohol of from about 50:1 to about 1:1 have proved to be ideal.

Component (a) preferably constitutes from about 85 to about 97% by weight of the foam inhibiting mixture.

Component (b) can be one or more of the known microcrystalline paraffin waxes having a melting point of from about 60° to about 95° C. and preferably from about 62° to about 90° C. Microcrystalline waxes such as these are, for example, a constituent of montan waxes or high-melting petroleum fractions (ceresin) and are distinguished by a content of branched and cyclic paraffins. They constitute from about 0.2 to about 5% by weight, and preferably from about 0.5 to about 3% by weight of the foam inhibiting mixture.

Component (c) can consist of one or more of the usual paraffin hydrocarbons which, in contrast to the microcrystalline waxes mentioned above, show more or less pronounced crystallization behavior. The melting point of these hydrocarbons, which are generally known as hard paraffins, is in the range of from about 40° to about 60° C., and preferably in the range of from about 42° to about 56° C. They constitute from about 0.5 to about 20% by weight, preferably from about 1 to about 10 by weight, and more preferably from about 1.5 to about 5% by weight of the foam-inhibiting mixture.

The total quantity of components (b) and (c) preferably amounts to at least 3% by weight, more preferably to between about 4 and about 10% by weight, and most preferably between about 4 and about 8% by weight of the foam-inhibiting mixture.

Component (d) is a finely divided, hydrophobized silica, and is present in the mixture in quantities of from about 0.05 to about 5% by weight, preferably in quantities of from about 0.1 to about 3% by weight, and more preferably in quantities of from about 0.2 to about 2% by weight of the foam-inhibiting9 mixture. Hydrophobized finely divided silica is a microfine silica produced by precipitation from silicate solutions, but more especially by the pyrogenic decomposition of silicon tetrachloride and which has been reacted in known manner which organochlorosilanes, as described for example in U.S. Pat. No. 3,207,698 and U.S. Pat. No. 3,388,073. One example is pyrogenic silicon dioxide which normally has a particle size of from about 5 to about 20 μm and which has been reacted with trimethyl chlorosilane or with dimethyl dichlorosilane.

Optional component (e) is a soft paraffin having a melting point of from about 32° to about 42° C., preferably from about 35° to about 40° C. A suitable soft paraffin is a petroleum jelly commercially available under the tradename VASELINE. Component (e) produces a further increase in the foam-inhibiting effect and can be present in quantities of preferably from about 0.1 to about 10% by weight, and more preferably from about 0.2 to about 5% by weight of the foaminhibiting mixture.

The foam inhibiitors of the invention are obtained by homogenizing the above-mentioned components, preferably while heating to temperatures of from about 80° to about 110° C. It is advisable initially to introduce component (a) and then to add components (b) to (e). The mixture is stable in storage and can be directly used as such.

The foam inhibitors are eminently suitable for foam suppression in synthetic resin, lacquer and dye dispersions which are intended for the production of clear or high-gloss moldings, lacquers and coatings. In preparations such as these, the foam inhibitor is used in quantities of from about 0.01 to about 1.5% by weight, and preferably in quantities of from about 0.05 to about 1% by weight of the dispersion. The foam inhibitors are highly effective and do not adversely affect gloss, despite the presence of hydrophobic silica. In particular, they reliably prevent the formation of troublesome microfoams. Gloss paints with the foam inhibitor incorporated therein are stable in storage. Their effect is roughly comparable to that of known, highly effective silicone foam inhibitors which, however, they surpass in their compatibility with gloss lacquer preparations because they do not lead to separation or hazing in the applied lacquer layers.

The invention is illustrated but not limited by the following examples.

EXAMPLES

I Production of the Foam Inhibitors

To produce homogeneous mixtures, the constituents listed in Table 1 were processed by introducing the molten paraffin waxes, the branched-chain alcohol when present, and the silanized silica (d) with intensive stirring into the mineral oil heated to 80° C. Stirring was continued until the mixture had cooled to room temperature The mineral oil used was a naphthenic paraffin oil having a pour point below 5° C. The branched-chain alcohol (Alcohol I) had been obtained by the "Guerbetization" of technical 1-decanol and consisted primarily of 2-octyl dodecanol. The microcrystalline paraffin (microwax) had a melting point of 92°–94° C., the hard paraffin a melting point of 42°–44° C. and the petroleum jelly (VASELINE) a melting point of 36°–39° C. The silanized silica had an average particle size of 15 μm and had been obtained by reacting pyrogenic silica with dimethyl chlorosilane.

TABLE 1

| Constituent (% by weight) | Example No. | | | | |
|---|---|---|---|---|---|
| | 1 | 2 | 3 | 4 | 5 |
| Mineral oil | 90.0 | 90.0 | 95.0 | 90.0 | 83.0 |
| Alcohol I | — | — | — | 5.0 | 10.0 |
| Microwax | 4.4 | 4.4 | 0.5 | 2.2 | 1.5 |
| Hard paraffin | 3.4 | 4.1 | 3.5 | 1.7 | 3.5 |
| Petroleum jelly (VASELINE) | 1.0 | — | — | 0.5 | 0.5 |
| Silanized SiO$_2$ | 1.2 | 1.5 | 1.0 | 1.1 | 1.5 |

For comparison, the known formulations (V$_1$–V$_4$) shown in Table 2 were tested as well as a gloss lacquer dispersion to which no foam inhibitor was added (Comparison V$_5$).

TABLE 2

| Constituent (% by weight) | Comparison | | | |
|---|---|---|---|---|
| | $V_1$ | $V_2$ | $V_3$ | $V_4$ |
| Mineral oil | 90 | 89 | 88 | 86 |
| Alcohol I | — | — | — | — |
| Paraffin (M.p. 42–44° C.) | — | 5 | — | — |
| Ester wax | — | — | 5 | — |
| Polydimethyl siloxane | — | 4 | 4 | 4 |
| Silanized $SiO_2$ | 10 | 2 | 2 | 10 |
| Emulsifier (nonylphenol-EO) | — | — | 1 | — |

The homogenized foam inhibitors were completely stable, even after storage for 6 to 10 weeks at room temperature (22° C.).

Performance Testing

For performance testing, the foam inhibitors were incorporated in the following gloss lacquer dispersion (quantities in parts by weight=P):
504 P of polyacrylic acid dispersion (50% by weight of water)
74 P of propylene glycol
2 P of sodium polyacrylate
252 P of titanium dioxide
81 P of ammonium polyacrylate solution (97.5% by weight of water)
8 P of preservative
17 P of 2,2,4-trimethylpentane-1,2-diol diisobutyrate
30 P of water
1 P of foam inhibitor (Examples 1 to 5).

The following performance tests were carried out with the dispersion lacquer thus prepared.

(a) Testing of the Finished Paint

Immediately after production of the dispersion paint, 80 P of the paint were mixed with 20 P of water and stirred for 1 minute at 2000 r p.m. with a dissolver (40 mm diameter dispersion disc). A tared standing cylindrical vessel was filled with this mixture to the 50-ml mark and the weight of this quantity of liquid was determined. The greater the weight of the sample, the lower the air content, i.e. the better the effect of the foam inhibitor. The result is expressed as the percentage inclusion of air, based on a foam-free (ideal) dispersion.

(b) Knife-Coating Test on Glass Plates

The test was carried out using a film-drawing apparatus. The foam-inhibited dispersion is poured into the frame of the knife coater which is subsequently drawn over a flat surface at a uniform speed. The film formed (200 μm) dries in air and is then inspected for the inclusion of air (microfoam) and for leveling and silicone faults. After 24 hours, a gloss measurement (according to GARDNER) was additionally carried out on the surface.

(c) Lambskin Roller Rest (On Glass Plates)

After production of the dispersion paint, 80 P of paint are mixed with 20 P of water and stirred for 1 min at 2000 r.p.m. using a dissolver. The sample is then applied by means of a paint roller (lambskin roller) to a carefully cleaned glass plate. After drying, the paint film is visually inspected for inclusions of air (bubble formation).

(d) Sponge Roller Test (On Hardboard Panels)

Hardboard panels measuring 20×30×0.4 cm are sealed by brush-coating on the smooth side with a 1:1 diluted plastic dispersion. 60 to 70 g of paint are then applied to the panels and spread with a sponge roller so uniformly that 15 g of wet paint (=250 g/m²) remain. The sponge roller used, which is 6 cm wide and 7 cm in diameter, consists of an open-cell polyurethane foam. The use of a roller such as this affords the advantage that not only are the foam bubbles included in the paint assessed, air is additionally incorporated in the paint, as is the case with brush application, albeit to a lesser extent.

The dry paint films are assessed on the following comparative scale:
1=very serious air inclusion
2=serious air inclusion
3=moderate air inclusion
4=slight air inclusion
5=very slight air inclusion
6=no air inclusion The results are set out in Table 3. They demonstrate the superiority of the foam inhibitors of the invention.

TABLE 3

| Example | Air inclusion (% by weight) | Knife-coating test | | Application | |
|---|---|---|---|---|---|
| | | Inclusions (mark) | Gloss % | Glass (mark) | Hardboard (mark) |
| 1 | 13.4 | 3–4 | 56 | 4 | 5 |
| 2 | 13.5 | 3–4 | 53 | 3–4 | 4–5 |
| 3 | 14.0 | 3–4 | 56 | 4 | 5 |
| 4 | 13.5 | 3–4 | 57 | 4 | 5 |
| 5 | 13.2 | 3–4 | 52 | 3–4 | 4–5 |
| $V_1$ | 14.6 | 3 | 38 | 3 | 3 |
| $V_2$ | 14.0 | 3 | 43 | 3 | 3–4 |
| $V_3$ | 14.0 | 3 | 42 | 3 | 4 |
| $V_4$ | 14.2 | 3 | 37 | 3 | 3–4 |
| $V_5$ | 18.0 | 2 | 24.6 | 2 | 2 |

What is claimed is:

1. A foam inhibiting agent comprising
(A) from about 70 to about 98% by weight of either
  (i) a mineral oil liquid at room temperature, or
  (ii) a mixture of a mineral oil liquid at room temperature and at least one alcohol of the formula:

$$R^1-CH_2-CH_2-CH-CH_2-OH \quad (I)$$
$$\phantom{R^1-CH_2-CH_2-C}|$$
$$\phantom{R^1-CH_2-CH_2-CH-C}R^2$$

in which $R^1$ and $R^2$ can be the same or different and represent $C_4$–$C_{16}$ alkyl radicals, and wherein the total number of carbon atoms in the alcohol is between 16 and 30,
(B) from about 0.2 to about 5% by weight of at least one microcrystalline paraffin wax having a melting point of from about 60 to about 95° C.,
(C) from about 0.5 to about 20% by weight of at least one hard paraffin having a melting point of from about 40 to about 60° C.,
(D) from about 0.05 to about 5% by weight of hydrophobized finely divided silica, and
(E) from 0 to about 10% by weight of a soft paraffin having a melting point of from about 32° to about 42° C.

2. A foam inhibiting mixture in accordance with claim 1 wherein said component (A) consists essentially of said component (A) (ii) mixture of mineral oil and said alcohol in a ratio of from about 50:1 to about 1:1.

3. A foam inhibiting mixture in accordance with claim 1 wherein component (B) is present in from about 0.5 to about 3% by weight.

4. A foam inhibiting mixture in accordance with claim 1 wherein component (C) is present in from about 1 to about 10% by weight.

5. A foam inhibiting mixture in accordance with claim 4 wherein component (C) is present in from about 1.5 to about 5% by weight.

6. A foam inhibiting mixture in accordance with claim 1 wherein the total quantity of components (B) and (C) is from about 4 to about 10% by weight.

7. A foam inhibiting mixture in accordance with claim 6 wherein the total quantity of components (B) and (C) is from about 4 to about 8% by weight.

8. A foam inhibiting mixture in accordance with claim 1 wherein component (D) is present in from about 0.1 to about 3% by weight 9. A foam inhibiting mixture in accordance with claim 8 wherein component (D) is present in from about 0.2 to about 2% by weight.

10. A foam inhibiting mixture in accordance with claim 1 wherein component (E) is present in from about 0.1 to about 10% by weight.

11. A foam inhibiting mixture in accordance with claim 10 wherein component (E) is present in from about 0.2 to about 5% by weight.

12. An aqueous lacquer or synthetic resin dispersion which contains from about 0.01 to about 1.5% by weight of the foam inhibiting agent of claim 1.

13. An aqueous dispersion in accordance with claim 12 wherein the dispersion contains from about 0.05 to about 1% by weight of the foam inhibiting agent of claim 1.

14. A method for reducing foam in aqueous lacquer or synthetic resin dispersions comprising adding thereto from about 0.01 to about 1.5% by weight of the foam inhibiting agent of claim 1.

15. A method for reducing foam in aqueous lacquer or synthetic resin dispersions comprising adding thereto from about 0.05 to about 1% by weight of the foam inhibiting agent of claim 1.

* * * * *